United States Patent Office 3,423,790
Patented Jan. 28, 1969

3,423,790
EXTRUSION APPARATUS
Ernesto Gabbrielli, 9 Spechtweg, Lustenau, Austria
Filed July 8, 1965, Ser. No. 470,501
Claims priority, application Switzerland, July 10, 1964, 9,091/64
U.S. Cl. 18—14
Int. Cl. B29d 23/04
7 Claims

ABSTRACT OF THE DISCLOSURE

A cylindrical body is rotatably mounted within a stationary cylindrical body. The two bodies are coaxially arranged and defined therebetween an annular chamber. A die member and a mandrel member coaxially define an annular extrusion gap, and channel means define a channel for the flow of a fluid from said chamber to said gap, allowing said fluid to flow further outwardly of the gap. Plastic material fed into the extrusion apparatus is extruded so that the molecular chains of the extruded material remain oriented in planes transverse of the extruder axis.

---

This invention relates to the extrusion of synthetic, organic, highly polymeric materials, hereinafter referred to as plastics, and particularly to an extrusion apparatus. The invention relates particularly to the extrusion of hollow or tubular plastic products.

Conventional tube extruders are equipped with a spreader or the like which rotates in the discharge end of the stationary extruder barrel and which causes the molecule chains of the extruded polymer to be oriented in the plane of rotation, that is, transversely of the extruder axis. If such an orientation of the molecule chains can be maintained in the finished product, its bursting strength reaches a maximum value consistent with the other properties of the material.

The flowing plastified material passes from the zone of chain orientation between the spreader and the barrel through an extrusion orifice or gap formed between an outer annular die and an inner mandrel which, in the conventional apparatus, is fastened to the die by a spider or like rigid structure which extends through the flowing plastic in the gap. The resulting partial obstruction of plastic flow disturbs the orientation of molecule chains, and the tubular product obtained has inferior bursting strength.

An object of the invention is the provision of tubular plastic extrudates which are homogeneous, and in which the polymer chains are oriented in planes transverse of the extrusion axis.

Another object is the provision of apparatus for making such a tubular extrudate.

With these and other objects in view, the invention, in one of its aspects, resides in an extrusion apparatus in which a roll and a barrel are coaxially arranged so that the barrel and roll define therebetween an annular chamber. The barrel and roll provide supports for a die member and a mandrel member having respective inner and outer exposed faces. One of these members is fastened to the associated support. The other member and the other support have movably engageable sealing faces so arranged that the exposed faces of the mandrel and die members coaxially define an annular extrusion gap when the sealing faces are engaged. The sealing faces extend transversely of the common axis of the mandrel and die members.

A channel connects the aforementioned chamber with the extrusion gap for flow of a fluid in a direction from the chamber to the gap and outward of the latter. The afore-mentioned other member is freely movable relative to the corresponding support in the direction of the common axis of the die and mandrel members away from the engaged sealing faces and transversely of the common axis.

Figure 1:
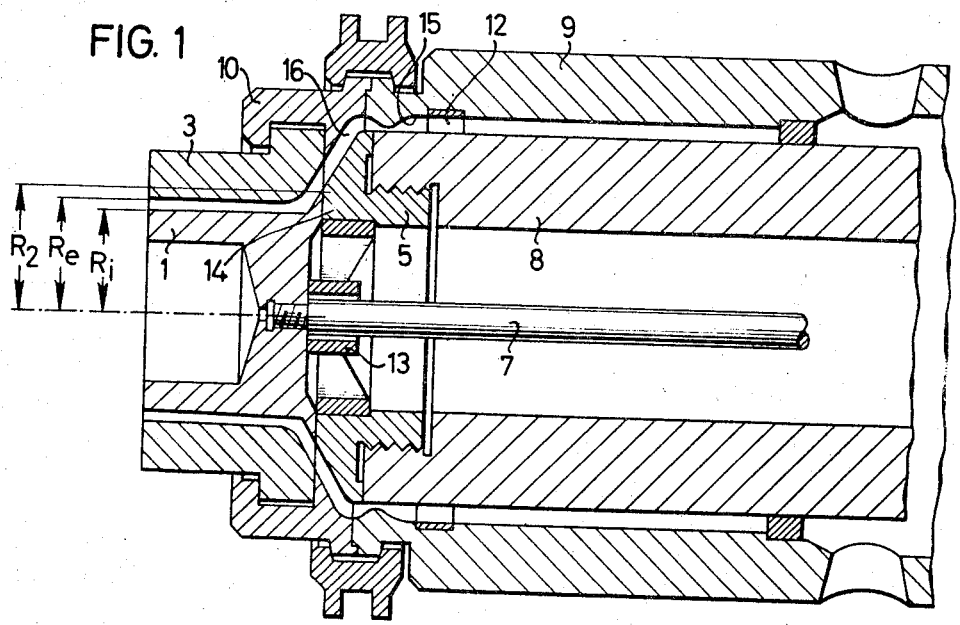
Figure 2:
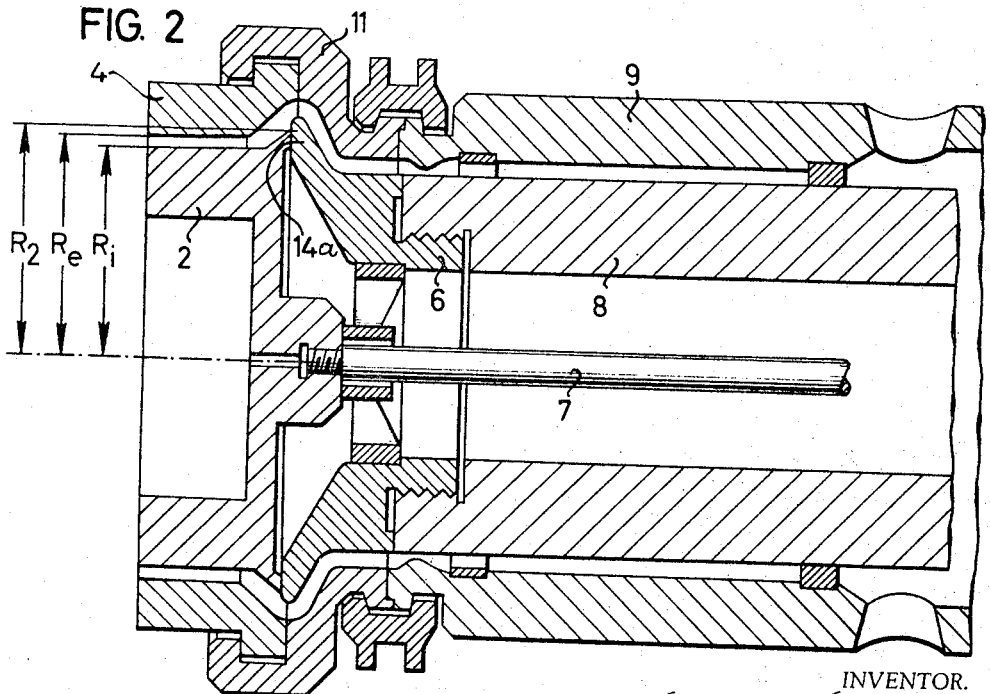
Figure 3:
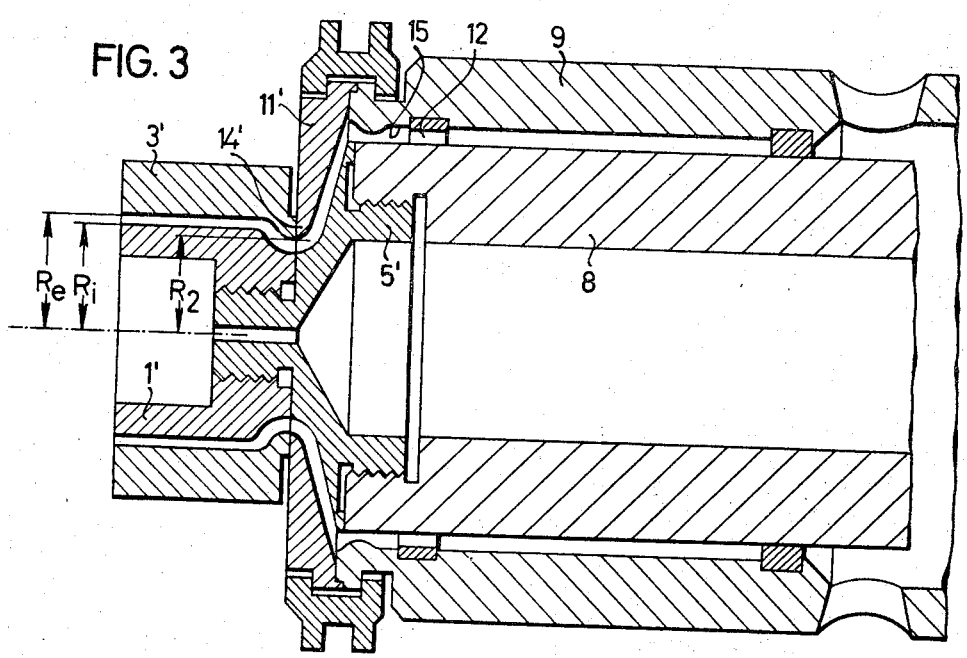
Figure 4:
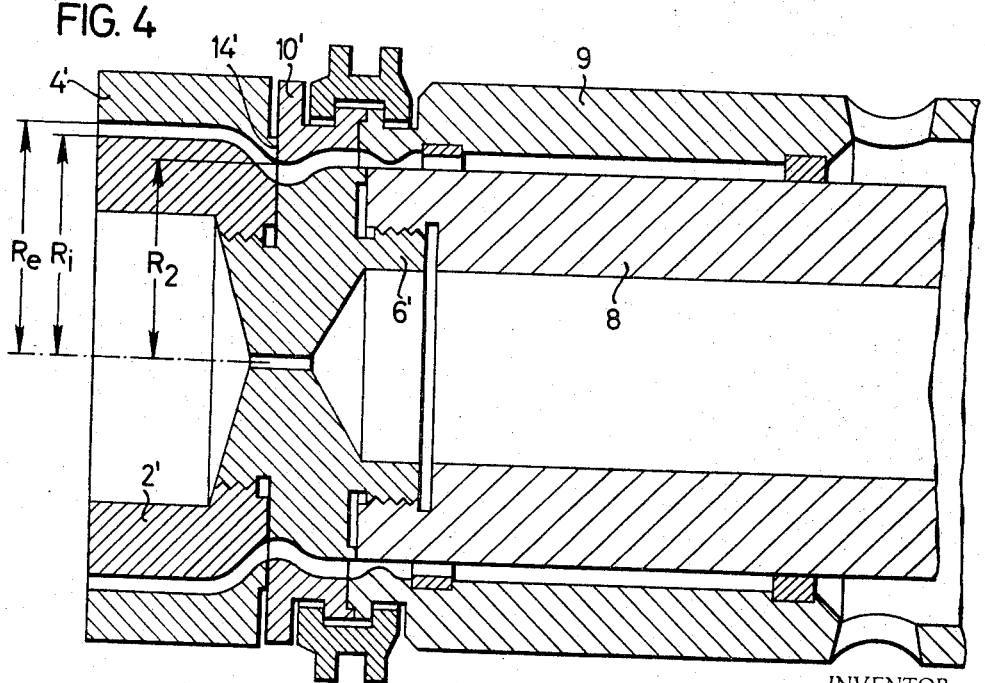

Other features and many of the attendant advantages of this invention will be readily appreciated from the following detailed description of preferred extrusion heads of the invention when considered with the appended drawing in which:

FIGS. 1 and 2 show two examples of a first type of extrusion apparatus in corresponding longitudinal sections; and FIGS. 3 and 4 illustrate two examples of another type of extrusion apparatus in a view analogous to that of FIG. 1.

Referring initially to FIG. 1, there is seen the discharge end of an axial extrusion press of a certain width whose advantages over a screw extruder include a mode of operation that ensures continuous and uniform orientation of the molecules in the thermoplastic material not only at the end of the pressure zone, but also in the working chambers of the press itself.

The illustrated portion of the press includes a stationary shell 9 in which a cylindrical roll 8 is mounted. A nozzle 12 is arranged near the discharge end of the press proper. The well-worked material is extruded through this nozzle. The plastic passes from the collector chamber 15 at the cylindrical terminal portion of the roll 8 through the nozzle 12 into the compression chamber 16. The walls of the chamber 16 are formed by portions of the stationary shell structure and by an inner, rotatable, annular element 5 fastened to the roll 8 by interengaging threads.

A mandrel 1 is axially contiguously adjacent the element 5 and is not connected by a spider or similar structure to the axially coextensive die 3. A thrust bearing 13 is provided to secure the mandrel 1 against axial movement away from the element 5, but it has been found that such a bearing is actually unnecessary with the illustrated configuration of the mandrel 1. The face of the mandrel exposed to the flowing plastic material has a conically tapering annular rear portion whose radius gradually decreases from $R_2$ to $R_1$. The remainder of the mandrel face is a cylinder of radius $R_1$. The corresponding cylindrical wall of the die 3 has a radius $R_e$. Assuming that the pressure in the annular gap between mandrel and die increases approximately linearly from 0 to a value $P_e$, the material of the cylindrical plastic tube extruded from the illustrated apparatus exerts an axial outward force S on the mandrel 1 which can be shown to have the following value:

$$S = \frac{1}{2} \cdot P_e \cdot \left(R_e^2 - R_i^2\right)\pi \tag{1}$$

This is the force that would have to be absorbed by the bearing 13 in the absence of a counterforce $S_c$ (presently to be discussed), if the cross section of the constriction between the die 3 and the element 5 would reach a value of the diameter $2R_1$, as may be the case in extrusion nozzles of large dimensions.

Because of the conical face of the mandrel 1, the plastic material exerts a counterforce $S_c$ on the mandrel 1 which urges corresponding annular faces 14 of the mandrel and of the element 5 into sealing movable engagement in a radial plane. The magnitude of the counterforce is arrived at from the formula:

$$S_c = P_e (R_2^2 - R_i^2)\pi \tag{2}$$

When S only equals $S_c$, the axial forces acting on the mandrel 1 are balanced. For $S=S_c$, it follows that $$R_2 = \frac{1}{2}\sqrt{R_e^2 + R_i^2}$$

If $R_2$ is greater than the equilibrium value calculated from Equation 3, the mandrel 1 is held against the annular face 14 of the element 5 by an axial force resulting from the pressure of the extrudate. Values of $R_2$ only slightly greater than the equilibrium value are preferred in order to avoid frictional heating of the faces 14, yet to maintain a tight sliding seal between the mandrel 1 and the element 5, and to avoid escape of plastic material from the compression chamber.

The frictional engagement between the faces 14 of the mandrel 1 and of the element 5 causes rotation of the mandrel which is braked by the stationary die 3, particularly in presses of large dimensions. A slight relative rotation of the mandrel 1 and die 3 is not detrimental, however, to the molecular orientation of the extrudate nor to the automatic thickness control of the extruded tube inherent in the illustrated structure as long as the mandrel engaging surface 14 of the element 5 is flat.

The central positioning of the mandrel 1 in the die 3 for thickness control becomes more important as the diameter of the extruded tube increases, and the automatic control of thickness by the mandrel 1 becomes more effective as the wall thickness of the tube decreases. Whereas it is practically impossible to produce thin-walled tubes of large diameter on extruders equipped with mandrels that are mounted on the dies by means of spiders or similar rigid structural elements, such tubes are readily made on extruders equipped with the floating mandrel of this invention.

The sealing faces 14 of the element 5 and of the mandrel 1 are preferably flat in a plane perpendicular to the extruder axis, but they also may be somewhat conical, spherical, or shaped otherwise as far as consistent with their intended function.

In the extruder shown in FIG. 1, the element 5 and an external retaining ring 10 define an annular channel for the extrudate. The channel slopes conically toward the extruder axis. The corresponding elements 6 and 11 of the modified apparatus illustrated in FIG. 2 define a channel for the plastified material which flares conically away from the axis. The inner radius $R_i$ of the tube produced in the last mentioned modified extruder is therefore much greater than the corresponding dimension of the tube produced in the first-described device.

In all other respects, the two extruders are closely similar, and operate in the same manner. The rear portion of the mandrel 2 shown in FIG. 2 has an exposed face which tapers conically in the direction of plastic flow, and thereby causes the mandrel 2 to be held against a face 14a of the element 6. The radial spacing of the associated die 4 from the mandrel 2, and the wall thickness $R_e - R_i$ of the extruded tube are somewhat greater than the corresponding dimensions of the first-described extruder. The die 4 is fastened to the shell 9 by a retaining ring 11.

When extrusion from either apparatus shown in FIGS. 1 and 2 is started, the mandrel 1, 2 is held against the face 14 of the corresponding inner annular element 5, 6 by a pull rod 7. When steady operating conditions are reached, the rod 7 may be withdrawn. The mandrels 1, 2 of the invention retain their position on the faces 14 of the elements 5, 6, and are automatically centered by the pressure of the extruded material.

There being no spider or other mandrel supporting structure in the flow path of the plastic, the molecule chains of the extruded material remain oriented in planes transverse of the extruder axis. The tubes discharged from the annular opening between the mandrel 1, 2 and the stationary die 3, 4 on the extruder of the invention have a significantly greater bursting strength than tubes produced from the same material on conventional extruders under otherwise identical conditions.

In the modified embodiments of the invention illustrated in FIGS. 2 and 4, the extruded tube rotates about its axis while emerging from the extruder, an arrangement which facilitates secondary operations on the extrudate, such as the application of a continuous or fibrous coating, and the decoration of the outer tube surface, for example, by embedded metal threads which also reinforce the surface and protect it against abrasion.

FIGS. 3 and 4 illustrate two extruders which differ from each other in the same manner as those shown in FIGS. 1 and 2 to produce extruded tubes or pipes which differ in internal radius $R_i$. The two modifications illustrated in FIGS. 3 and 4 will therefore be described jointly.

Their annular dies 3', 4' have inner faces whose rear portions flare conically in the direction of plastic flow, and whose front portions are cylindrical. The pressure of the plastic being extruded in the annular gap between the freely movable dies 3', 4' and the corresponding mandrels 1', 2' thus holds the dies against a flat seating surface 14' of the corresponding stationary outer ring members 10', 11' which are axially interposed between the dies and a barrel 9 to which they are fastened. The barrel is substantially identical with that illustrated in FIG. 1, and encloses a corresponding cylindrical roll member 8. A nozzle 12 is interposed between the barrel 9 and roll 8.

The dies 3', 4' are axially held against the ring members 10', 11' as long as the radius $R_2$ of the annular orifices between the outer ring members 10', 11' and the corresponding inner ring members 5', 6' is smaller than the external radius $R_e$ of the extrudate, and smaller than the corresponding dimension of the extrusion orifice between the dies 3', 4' and the mandrels 1', 2'. The mandrels are fixedly fastened to the rotating roll 8. The dies 3', 4' float freely as soon as stable operating conditions are reached, and are rotated by frictional engagement with the extruded material.

The principal features of the invention are equally applicable to extrudates which are not axially symmetrical. Relative rotation of the dies 3', 4' and mandrels 1', 2' obviously must be avoided with such non-cylindrical shapes, and synchronous rotation of the roll 8 and dies 3', 4' is provided in such cases by an external drive for the dies 3', 4' whose speed corresponds to that of the roll 8.

It will be appreciated that the take-off apparatus must be chosen to permit the rotation of the extruded tube. In the extruders of the type discussed, the circumferential velocity of the extrudate is low enough to permit reinforcing inserts and protective outer layers to be applied to the outer tube surface in the solidification zone immediately ahead of the extrusion die where the plastic material is still of pasty consistency.

In extrusion presses whose rotary member 8 rotates at high speed, as in a screw extruder, I prefer to employ extrusion nozzles whose outer die member is driven by a rotating, independent element of the apparatus.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What I claim is:
1. An extrusion apparatus comprising, in combination:
 (a) barrel means having an axis;
 (b) roll means arranged in said barrel means for rotation about said axis,
  (1) said barrel means and said roll means defining therebetween an annular chamber and constituting a pair of support means;
 (c) an annular die member having an axis and an inner annular axially extending, exposed face;
(d) a mandrel member having an axis and an outer, annular, axially extending, exposed face of smaller cross section than said inner face,
  (1) said die member and said mandrel member constituting a pair of members;
(e) fastening means securing one of said members to one of said support means;
(f) movably engageable sealing faces on the other one of said members and the other one of said support means,
  (1) said mandrel member being received in said die member in substantially coaxial position when said sealing faces are engaged, the engaged sealing faces extending in a direction transverse of the axes of said members,
  (2) said members in said coaxial position thereof defining an annular extrusion gap between said exposed faces thereof;
(g) means defining a channel for connecting said chamber to said gap for flow of a fluid in a direction from said chamber to said gap and axially outward of the latter, and
(h) securing means securing said other member against movement relative to said other support means in the direction of the axes of said members away from the sealing face of said other support means during said flow of said fluid while permitting rotation of said other member relative to said other support means about said axes during said flow.

2. An apparatus as set forth in claim 1, wherein said sealing faces are flat and substantially perpendicular to said axes of said exposed faces when said mandrel member is received in said die member in said substantially coaxial position.

3. An apparatus as set forth in claim 1, wherein the axes of said exposed faces substantially coincide with the axis of said barrel means in said substantially coaxial position of said members.

4. An apparatus as set forth in claim 1, wherein the exposed face of said other member has an axially tapering portion facing away from the sealing face of said other member and substantially constituting said securing means.

5. An apparatus as set forth in claim 4, wherein said other member is said mandrel member, and said other support means is said roll means.

6. An apparatus as set forth in claim 4, wherein said other member is said die member, and said other support means is said barrel means.

7. An apparatus as set forth in claim 6, wherein said mandrel member is secured to said roll means for joint rotation therewith.

References Cited
UNITED STATES PATENTS

| | | | |
|---|---|---|---|
| 2,046,541 | 7/1936 | Becker | 18—14 |
| 2,874,411 | 2/1959 | Berquist | 18—14 X |
| 3,051,990 | 9/1962 | Peterson | 18—14 |
| 3,149,377 | 9/1964 | Morse. | |
| 3,228,064 | 1/1966 | Plummer. | |
| 3,281,897 | 11/1966 | Mercer | 18—14 |

FOREIGN PATENTS 1,382,578  11/1964  France.

WILLIAM J. STEPHENSON, *Primary Examiner.*